United States Patent
Divo et al.

(10) Patent No.: US 9,535,270 B2
(45) Date of Patent: Jan. 3, 2017

(54) METHOD FOR MEASURING THE GEOMETRIC MORPHOMETRIC PARAMETERES OF A PERSON WEARING GLASSES

(71) Applicant: ESSILORE INTERNATIONAL (Compagnie Generale d'Optique), Charenton-le-Pont (FR)

(72) Inventors: Fabien Divo, Charenton-le-Pont (FR); Philippe Pinault, Charenton-le-Pont (FR); Christophe Condat, Charenton-le-Pont (FR); Ahmed Haddadi, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/414,833

(22) PCT Filed: Jul. 18, 2013

(86) PCT No.: PCT/FR2013/051746
§ 371 (c)(1),
(2) Date: Jan. 14, 2015

(87) PCT Pub. No.: WO2014/016502
PCT Pub. Date: Jan. 30, 2014

(65) Prior Publication Data
US 2015/0198822 A1     Jul. 16, 2015

(30) Foreign Application Priority Data
Jul. 24, 2012   (FR) .................................... 12 57167

(51) Int. Cl.
G02C 13/00        (2006.01)

(52) U.S. Cl.
CPC .................................. *G02C 13/005* (2013.01)

(58) Field of Classification Search
USPC .................................................. 351/200–246
See application file for complete search history.

(56) References Cited

U.S. PATENT DOCUMENTS

2010/0195045 A1* 8/2010 Nauche ................ G02C 13/005
                                                      351/204
2015/0146168 A1* 5/2015 Divo .................... A61B 3/0091
                                                      351/204

FOREIGN PATENT DOCUMENTS

| DE | 102004063160 | 7/2006 |
| WO | 2005038511   | 4/2005 |
| WO | 2013045133   | 4/2013 |

OTHER PUBLICATIONS

Search Report dated 2013.

* cited by examiner

*Primary Examiner* — Mohammed Hasan
(74) *Attorney, Agent, or Firm* — Sofer & Haroun, LLP

(57) ABSTRACT

The invention relates to a method for measuring the geometric morphometric parameters of a person wearing glasses (21), said method implementing an independent computing device (1, 10) comprising a screen, a target (8, 18), a compact image acquisition system (7, 17) which is provided with a means of determining the inclination thereof, said system (7, 17) being connected to said screen, and a computer for controlling the image acquisition system (7, 17) and processing the images obtained. The main feature of a measuring method according to the invention is that it comprises a step in which the person observes the target (8, 18) placed in a position known to the image acquisition (Continued)

system (7, 17), by rolling his or her head in an upward direction while keeping his or her eyes fixed on the target (8, 18).

14 Claims, 3 Drawing Sheets

METHOD FOR MEASURING THE GEOMETRIC MORPHOMETRIC PARAMETERES OF A PERSON WEARING GLASSES

RELATED APPLICATIONS

This application is a National Phase Application of PCT/FR2013/051746, filed on Jul. 18, 2013, which in turn claims the benefit of priority from French Patent Application No. 12 57167 filed on Jul. 24, 2012, the entirety of which are incorporated herein by reference.

BACKGROUND

Field of the Invention

The technical field of the invention relates to methods for measuring morpho-geometric parameters of a spectacle wearing individual. These parameters may, for example, include the pupillary distance PD, the height H separating the pupil from the lower edge of a lens, the pantoscopic angle ΘP, which is the angle of inclination of the lenses relative to the facial plane of the individual, the distance DLE between the eye and the lens L, and the center of rotation CRO of the eye. Knowledge of these parameters is essential if a pair of spectacles, and in particular a pair of progressive lenses, is to be properly personalized.

Description of Related Art

Methods allowing a certain number of these morpho-geometric parameters to be measured already exist. A first category of these methods employs a large vertical measuring column, with a video camera adjusted to eye height, the spectacle wearing individual looking into a mirror. This type of apparatus is very bulky and therefore requires large premises to carry out the measurements, and it is rather inflexible to use insofar as it cannot easily be moved in order to refine the measurements, nor be dissociated into several elements so as to adapt to a given situation.

A second category of methods involves a smaller apparatus, that can in particular be installed on a table, but that requires a very constraining protocol for measurement and positioning of the spectacle wearing individual. Indeed, this type of method compels the individual to adopt a particular head carriage, and the installation of a clip furnished with a balance-bar on the spectacle frame. A first step then consists in making the individual adopt a natural posture, the balance-bar then being clamped to freeze the angle between the clip and the balance-bar, this angle corresponding to the pantoscopic angle. During a second step, the individual equipped with his spectacle frame and clip, looks at a video camera fixed above a screen. He must incline his head in such a way that the clamped balance-bar is perpendicular to the axis passing through the eyes and the video camera. Such a method demands complex and precise adjustments, and calls for a certain dexterity on the part of the spectacle wearing individual, so as to be able to position himself precisely with respect to the axis of the video camera and to freeze the position of the balance-bar accordingly.

OBJECTS AND SUMMARY

The methods for measuring morpho-geometric parameters according to the invention implement an apparatus which is flexible to use and can easily and rapidly perform precise and reliable measurements of said parameters, while not requiring the spectacle wearing individual to adopt constraining postures. Such methods are designed to eliminate a certain number of potential sources of error in respect of the determination of the morpho-geometric parameters, and in such a way as to approximate a natural posture.

The subject of the invention is a method for measuring morpho-geometric parameters of an individual wearing spectacles, said method implementing an autonomous computerized device comprising a screen, a target, a compact image acquisition system furnished with a means for determining the inclination thereof, said system being linked to said screen, and a computer making it possible to control the image acquisition system and to process the images obtained, characterized in that it comprises the following steps, Acquisition of an item of information relating to a first position of the frame worn by an individual, when he is looking at a point situated in front of him at infinity, with a natural head carriage in a substantially horizontal direction, the pair of spectacles occupying a natural position on the individual's face, Observation by the individual of the target placed in a known position with respect to the image acquisition system, while performing at least one upward pitching movement of his head without taking his eyes off the target, the pair of spectacles maintaining an unchanged position on the individual's face with respect to the first step, Acquisition by means of the same image acquisition system as that used for the first posture, of several images of the individual's face during this rotation movement, each image corresponding to a particular degree of inclination of the head, Selection of the image closest to the ideal image for which the inclination of the face with respect to an axis linking the eyes to the observed target is identical to the inclination of the face with respect to a horizontal direction adopted by the individual when he is looking at a point at infinity, Processing by the computer of the selected image so as to determine the morpho-geometric parameters of the individual, on the basis of the position of the eyes, of the position of the frame in the first posture, of the position of the frame on the selected image, and of the degree of inclination of the image acquisition system, Outputting of the result of the measurements.

A problem encountered with a method for which an individual were to adopt only two distinct and fixed postures, one to look at a point situated at infinity in front of him, and the other to look at a target which is not necessarily aligned along a horizontal direction, is that it introduces, in a quasi-systematic manner, an error in the form of an angular discrepancy. Indeed, the angle of inclination of the individual's face with respect to an axis linking his eyes to the target is slightly different from the angle of inclination made by his face with a horizontal axis linking his eyes to the fictitious point situated at infinity. Even though this difference remains restricted, it may however induce non-negligible discrepancies in the determined values of the individual's morpho-geometric parameters. The phase of processing the two images thus acquired then necessitates the use of a specific algorithm, intended to correct this error. The principle of a measurement method according to the invention is to circumvent this additional step of correcting this angular discrepancy, by selecting an image, which will tend to the ideal image, for which the previously mentioned angular error is zero. To accomplish this operation, the individual is firstly asked to look at the target while nodding his head downwards, or upwards, and then to acquire a succession of images of the individual's face corresponding to various inclinations of the individual's head, and finally to select the image for which the error tends to zero. In this manner, the image processing step will be performed directly, without introducing any additional correction phase. In a method according to the invention, the position of the spectacle frame on the individual's face remains constant during the steps of viewing a point at infinity and of viewing the target. The image acquisition system can comprise at least one high-definition photographic rig or at least one high-definition video camera. The inclination of the axis of the image acquisition system must be known precisely so as in particular to correct the parallax errors due to this inclination. The image acquisition system can be used, either in a fixed manner, with a given angle of inclination, or in a mobile manner ranging over an angular inclination span. For the first configuration, it is the wearer who will adapt his position in such a way as to make his face appear at the center of the field of the video camera. For the second configuration, the inclination of the acquisition system will be adapted to the position of the individual so as to properly enframe his face. The term "compact" ascribed to the image acquisition system signifies that said system is of small dimension, and that it can be easily manipulated in order to be placed on a standard item of furniture of table or desk type, and to be inclined. Advantageously, the target is carried by the image acquisition system. In this manner, the item of equipment necessary for the implementation of a method according to the invention is less dispersed. According to another preferred embodiment of a measurement method according to the invention, the target consists of the image acquisition system itself. The images taken by the acquisition system, in particular when the individual is looking at the target, mainly represent the spectacle frame positioned with respect to the individual's eyes. Specifically, all the information required to carry out information-processing of the images in order to obtain the sought-after parameters must appear clearly in said images, via the spatial position of said frame relative to the eyes of the individual. It is therefore essential that both the frame and the eyes of the individual appear clearly and precisely in the images. The morpho-geometric parameters are then easily deduced from said photos using everyday trigonometric relationships. The main function of the screen is to make it possible to view the images acquired when the individual adopts the various postures. The screen may also be used to return the results of the measurements of the sought-after morpho-geometric parameters. The method may be carried out either by the spectacle wearing individual themselves, or by an operator, possibly an optician. The step of acquiring the item of information relating to the inclination of the frame when the individual is looking horizontally toward infinity can be performed in various ways, by means for example of the image acquisition system which will take a snapshot of the individual's face, or by means of an electronic mapping device of inclinometer and/or accelerometer type, said device being secured to the frame or on a clip which is fixed to said frame. The term "secured" signifies that the removable and positionable electronic device is either on the clip or on the frame or that said electronic device is fixed securely in a housing provided for this purpose either on the clip or on the frame, or that said electronic device is integrated inside the frame or inside the clip. It is recalled that a pitching movement is a movement of pivoting of the head about a horizontal axis, from front to back. A method according to the invention will rather favor steps of measurements, with the intention of proposing a situation of natural and easy posture, by the pitching movement on the part of an individual. The parameters determined by such a method will thus be more precise and more reproducible than those requiring a constrained posture.

Advantageously, the image acquisition system is a high-resolution video camera. Typically a high-resolution video camera is a video camera with a resolution of greater than 1 Mega Pixels. Indeed, the greater the definition of the video camera, the more satisfactory the precision in the measurements.

According to a first preferred embodiment of a method according to the invention, the step of acquiring the item of information relating to the first position of the frame is carried out on the basis of an image of the individual's face, obtained with the image acquisition system. A simple and sufficiently well defined photo on which the individual's face appears in a centered manner may suit.

In a preferential manner, the frame is equipped with a mapping element in the form of a clip furnished with markers and fixed on said frame, said markers being representative of the spatial orientation of the frame. Such a clip is representative of the plane of inclination of the frame on the face of an individual, and allows better viewing on an image, of this inclination. In this case, only one video camera is required to determine this inclination, from the dimensional characteristics of said clip in the image captured by the video camera. Such a clip is already known. Each marker can, for example, appear in the form of a square divided into four small squares, the two small squares of one diagonal being colored differently from the other two small squares situated on the other diagonal.

According to a second preferred embodiment of a measurement method according to the invention, the step of acquiring the item of information relating to the first position of the frame is carried out by means of an electronic mapping device secured to the frame or on a clip fixed to said frame. This embodiment does not require the acquisition of an image. The electronic mapping device, which may for example consist of an inclinometer and/or an accelerometer, is linked, by wire or wirelessly, to a remote apparatus which will directly process the signals received, to provide an item of information about the inclination of the frame. This device being powered by a conventional autonomous system, for example of rechargeable or non-rechargeable battery/cell type, or in a wired manner involving a USB cable, it grants a little more freedom of movement to the spectacle wearing individual, since he is no longer compelled to remain frozen in a position, in order to be photographed or to be filmed. Preferably, the clip to which the electronic mapping device is tied can consist of the clip equipped with markers, and to which said electronic mapping device has been added.

In an advantageous manner, the clip is fitted with a wireless communication module making it possible to upload the measurements performed to a remotely situated rig. This embodiment is still more flexible and more user-friendly, since the individual can move about freely, without being constrained by a linking wire between the clip and a remotely situated processing apparatus.

Preferably, the means for determining the inclination of the image acquisition system is an inclinometer. A priori, the image acquisition system is frozen in a given position. But it may happen that for very tall individuals it is necessary to incline the image acquisition system to obtain an image of his eyes and of his frame which is satisfactory, that is to say an image in which said eyes and said frame are centered on the screen. Now, this inclination will take an important place in the determination of the morpho-geometric parameters of the individual, and must therefore be known precisely so as thereafter to be integrated into the computation of said parameters.

Preferably, the morpho-geometric parameters measured by said method are the height H between the pupil and the lower rim of the lens L, and the pantoscopic angle ΘP. It is recalled that the pantoscopic angle corresponds to the angle of inclination of the lenses L with respect to a vertical plane, when the frame is placed on the nose of the individual and the latter is looking into the far distance.

Preferably, an operator is placed in front of the spectacle wearing individual, said operator carrying out the adjustment of the image acquisition system and controlling the various steps of the method of measurements according to the invention. The method can indeed be implemented by an optician to obtain the measurement of the morpho-geometric parameters of a spectacle wearing individual. He thus manipulates the image acquisition system at his convenience, and equips or otherwise, the spectacle wearing individual with a conventional clip and/or equipped with an electronic mapping device in the form of 3D sensors, which may, for example, be an inclinometer and/or an accelerometer. Likewise, he guides the individual in the room to obtain optimized images of the eyes and of the frame of the individual on the viewing screen. Accordingly, he views, in real time, said images on the screen turned toward him. It is also the optician who triggers the picture-taking and who launches the image processing via the computer. A method of measurements according to the invention has been mainly fine tuned to be carried out at an optician's.

According to another preferred embodiment of a measurement method according to the invention, the inclination of the acquisition system is fixed, the individual positioning his face at the suitable height, to make it appear in the center of the image. Indeed, it may happen that the image acquisition system is not adjustable in inclination. In this case, the acquisition system is frozen in a given position, and it is the individual who moves his face so as to bring it to the center of the field of said acquisition system. For this configuration, the individual undergoes a slight prior positioning constraint, so as to afford the right conditions necessary for precise and reliable measurements.

The invention also pertains to a measurement device for the implementation of a measurement method according to the invention. The main characteristic of a device according to the invention is that it comprises a computer, at least one video camera equipped with an inclinometer, a display screen making it possible to view the pictures taken by said video camera as well as the result of the measurements, the position of the video camera and the position of the screen being able to be set independently of one another. This measurement device is equivalent to a measuring kit, in which the various parts are connected to one another in order to interact and deliver the desired measurements, without necessarily being restricted to a particular arrangement. Indeed, this type of device exhibits a certain flexibility in respect of its mounting, and can therefore easily be installed in any type of environment, be it on a table or a desk, or quite simply on the floor. A screen position that can be set independently of the position of the video camera makes it possible to multiply the configurations of use of a measurement device according to the invention and to increase the performance of a determination method according to the invention by positioning, as precisely as possible, the various items of equipment required to implement said methods.

Advantageously, the measurement device consists of a tablet grouping together the screen, a secondary video camera, the inclinometer and the computer, as well as said at least one video camera. It must be clearly stressed that the video camera and the tablet are dissociated. This version of the device is one of the most compact, and it may therefore be installed in a small space. Grouping together several constituent components of the device in a tablet of small dimension adds further to the flexibility of use of the measurement device, since an individual or an operator can control the entire method on the basis of one and the same object, and operate the appropriate adjustments without having to move or to displace the elements with respect to one another. A tablet is assumed to be an object the small size of which is compatible with easy manual handling by an individual or an operator. This type of object may, in particular, be easily moved manually in a room, in order to be installed in a precise location and to be oriented in the desired direction. This tablet may possess a touch screen, or more conventionally be operated by means of a mouse. The video camera can be fixed directly to this tablet, or to a support making it possible to hold said tablet.

In a preferential manner, the measurement device comprises an element for mapping the frame in the form of a clip possessing markers.

According to another preferred embodiment of a measurement device according to the invention, said device comprises an electronic device for mapping the frame. Preferably, the electronic mapping device consists of an inclinometer and/or an accelerometer.

Preferably, the measurement device comprises a support on which are fixed the tablet and the video camera. The support makes it possible to compact the device by allowing the video camera to be placed in proximity to the tablet, the distance between these two elements being less than a few centimeters, and preferably less than 5 cm.

In an advantageous manner, the video camera and the tablet are situated on either side of a vertical plane and make between themselves an angle lying between 15° and 45°. Advantageously, this angle equals 30°. In this manner, the screen is oriented in a certain direction and the video camera is oriented in an opposite direction. This arrangement allows an optician to observe directly on the screen of the tablet, the face of the spectacle wearing individual, which is recorded by the video camera placed at the back of said tablet. For this configuration, the optician is not compelled to place the video camera at the height of the individual's face in order to acquire an image. He merely needs to place the measurement device on a table or a desk and to accurately adjust the inclination of the tablet and of the video camera.

Advantageously, the measurement device comprises a flash and a capacitor mounted on an electronic card powered by a cable of USB type, said capacitor being able to supply the power necessary for the operation of said flash. Such a capacitor exhibits the advantage of being able to charge the flash very rapidly and therefore to trigger the flash several times over a short period.

The methods for measuring morpho-geometric parameters of an individual according to the invention exhibit the advantage of being particularly ergonomic and user-friendly, insofar as the spectacle wearing individual does not have to bear a particular item of equipment and does not have to indulge in a series of constraining and repetitive postures. Moreover, they have the advantage of instantaneously outputting the result of the measurements to the individual or to the optician, either by way of a screen, or by means of a printed document. Finally, the measurement device implemented in a method according to the invention is of restricted size and can therefore be installed in a room of small volume, on a table or on a desk.

BRIEF DESCRIPTION OF THE DRAWINGS

A detailed description of a preferred embodiment of a measuring method according to the invention is given below with reference to FIGS. 1 to 6.

DETAILED DESCRIPTION

Figure 5:
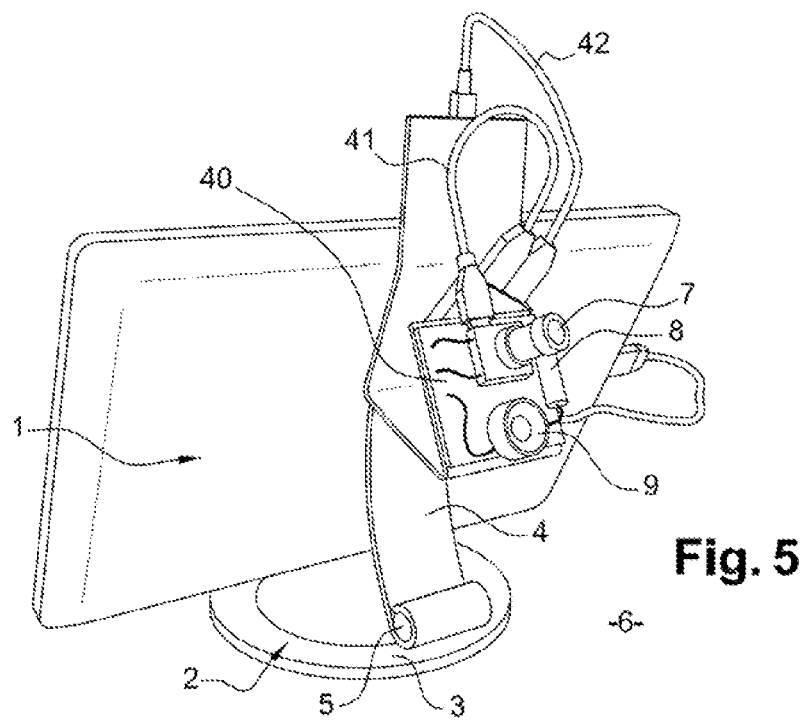
FIG. 5 is a perspective view of a first preferred embodiment of a device making it possible to implement a method according to the invention.

Referring to FIG. 5, a first preferred embodiment of a measurement device making it possible to implement a method for measuring morpho-geometric parameters of a spectacle wearing individual consists of a tablet 1 comprising a screen and a computer, and furnished with a support 2 allowing it to rest on a horizontal plane surface. This support 2 comprises a broad circular stand 3 prolonged by a holding stem 4 mounted articulated on said stand 3 by means of a rotation axis 5. Stated otherwise, when the stand 3 rests on a horizontal surface 6 the stem 4 is in a more or less inclined position with respect to a vertical direction. This stem 4 can be regarded as a slender metallic band. The tablet 1 rests on the stand 3, while being held by the stem 4. An image acquisition system 7 in the form of a high-resolution video camera, advantageously with a resolution of greater than or equal to 1 million pixels, is fixed to the stem 4 by way of an electronic card 40, while lying at the back of said tablet 1. The electronic card 40 also supports a viewing target 8 for the individual, and a flash 9 to allow better mastery of the lighting conditions, and making it possible to view on the images acquired by the video camera 7 and visible on the screen, the corneal reflections of each eye so as to obtain better precision in the measurements. The electronic card 40 also supports a capacitor in the vicinity of the flash 9. This capacitor, which may for example represent the target 8, is recharged by way of the electronic card 40, which is powered by at least one USB cable 41,42, said capacitor being able to provide the energy necessary to operate the flash 9. This capacitor has the advantage of being able to charge the flash 9 very rapidly, and therefore of avoiding overly long latency times between two consecutive flashes. The tablet 1 can possess a touchscreen or be used by way of a mouse. Built into said tablet 1 is the computer and its associated software making it possible to trigger the video camera, retrieve the images, carry out the processing of said images and display the result of the measurements. The normal to the screen is oriented in a first direction in space, and the sighting axis of the video camera 7 is oriented in a second direction, which is opposite to the first direction with respect to a vertical plane. The video camera 7 is fitted with an inclinometer making it possible to determine its inclination, whatever its orientation in space. This device 1 is of small dimension and can easily be installed on a table or a desk. It is moreover configured to be manipulated by an operator, who may be an optician, desiring to measure the morpho-geometric parameters of a spectacle wearing individual. Indeed, the spectacle wearing individual 21 is positioned in front of the video camera 7, while the optician places himself facing the screen of the tablet 1 and pivots the holding stem 4 carrying the video camera 7, so that the frame 21 and the eyes 27 of the individual are properly enframed on the viewing screen. The measurement method according to the invention can then be launched. According to another variant embodiment, the video camera and the screen of the tablet 1 can be placed side by side to allow the measurement method according to the invention to be controlled by the spectacle wearing individual himself.

Figure 6:
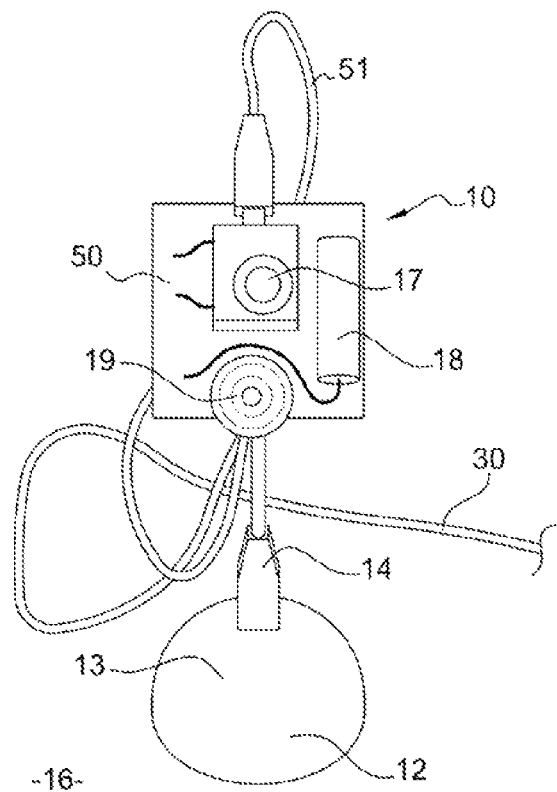
FIG. 6 is a perspective view of a second preferred embodiment of a device making it possible to implement a method according to the invention.

Referring to FIG. 6, a second preferred embodiment of a measurement device 10 according to the invention comprises an image acquisition system 17 in the form of a high-resolution video camera, advantageously with a resolution of greater than or equal to 1 million pixels. This video camera 17 is carried by a support 12, exhibiting a broad stand 13 surmounted by a deformable stem 14 that can easily twist to adopt a plurality of positions. When the stand 13 rests on a substantially plane surface 16, the stem 14 is in a more or less inclined position with respect to a vertical direction. An electronic card 50 which is fixed to the stem 14 supports the video camera 17, a viewing target 18 for the spectacle wearing individual 21, and a flash 19 to allow better mastery of the lighting conditions, and making it possible to view on the images acquired by the video camera 17 and visible on the screen, the corneal reflections of each eye, and thus obtain better precision in the measurements. The electronic card 50 supports a capacitor in the vicinity of the flash 19. This capacitor, which may, for example, constitute the target, is thus recharged by way of the electronic card 50, which is powered by at least one USB cable 51, said capacitor being able to provide the energy necessary to operate the flash 19. This capacitor has the advantage of being able to charge the flash 19 very rapidly, and therefore of avoiding overly long latency times between two consecutive flashes. This video camera 17 is fitted with an inclinometer making it possible to determine its inclination, whatever its orientation in space. A viewing screen associated with a computer, placed in the immediate environment of said video camera 17 so as to be able to view the images acquired by said video camera 17, as well as the results obtained, is linked to said video camera 17 by way of a data link, such as for example a USB cable 30. This cable 30 makes it possible to dispatch the images obtained as well as the data of the inclinometer to the computer. The computer of this embodiment offers the same possibilities as those of the computer of the first embodiment. Depending on the orientation of said screen, the method of measurements according to the invention may be controlled, either by an optician, or by the spectacle wearing individual himself. This image acquisition device 10 is of small dimension and can easily be installed on a table or a desk. It can even be moved on said table or said desk, and be more or less inclined, by virtue of simple manual manipulation.

For the two embodiments described, the video cameras 7,17 have an orientation in portrait mode, thereby making it possible to cover a wide range of height of individual without having to adjust the orientation of said video cameras 7,17. However, for the non-standard situations corresponding for example to an individual of overly large height, or one who were seated whereas he ought rather to be standing and vice versa, the video camera 7,17 is inclined by the appropriate angle to enframe the image on the wearer's face, and the inclinometer makes it possible to measure this angle of inclination so as to integrate it thereafter into the processing of the images acquired so as to correct the measurements obtained. Another variant embodiment of a method according to the invention consists in using a fixed video camera 7,17 that cannot be adjusted in inclination, the wearer having to adapt his position, by means for example of the height adjustment of the seat on which he is seated, so that his face appears centered on the screen of the tablet 1. In addition to the images obtained by the video cameras 7,17, the screens also make it possible to display the result of the measurements, in a quasi-instantaneous manner. The computer of the two measurement devices 1,10 integrate software able to trigger the video camera, retrieve the photos, carry out the processing of images and the computations of height, of interpupillary distance, etc., and capable of displaying the results.

Figure 1:
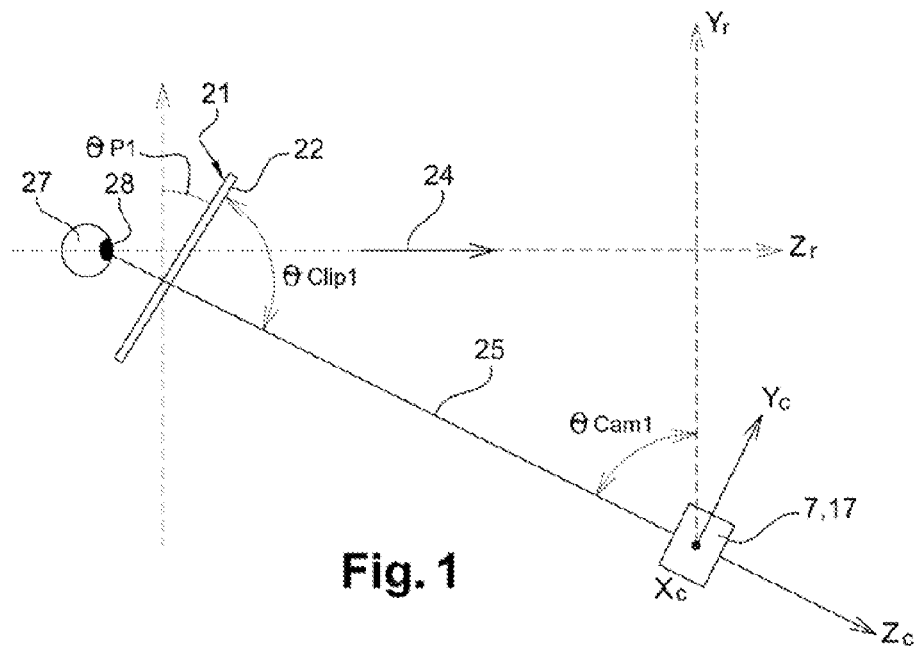
FIG. 1 is a schematic profile view of the head of an individual and of a video camera, the individual looking ahead at a point at infinity in a horizontal direction.

Referring to FIG. 1, the spectacle wearing individual 21, whose frame is equipped with a clip 22 with markers, places himself in front of a high-definition video camera 7,17. An optician asks the individual to adopt a first, comfortable and natural, posture consisting in looking ahead at a point at infinity. The direction of vision, delineated by the arrow 24 is then substantially horizontal. The optician adjusts the video camera 7,17 so as to see the individual's face on a screen which is linked to the video camera 7,17, by inclining if appropriate, the video camera 7,17. Once the individual's face has been properly positioned in the field of the video camera 7,17, the optician acquires a first image. The computer then determines the precise three-dimensional (3D) orientation of the clip 22 of the frame 21, and deduces therefrom a pantoscopic angle ΘP1, which is determined as a function of the angle Θclip1 of the clip 22 with respect to the axis 25 of the video camera 7,17, and with respect to the angle ΘCam1 of the video camera 7,17 with the vertical and measured with the inclinometer of the video camera 7,17. The measurement of the pantoscopic angle ΘP1 by the clip 22 is performed by virtue of at least three markers positioned on the clip 22, whose relative positions are known perfectly. These markers define a unique plane, and the video camera 7,17 associated with image processing software will determine the 3D position of these markers in the coordinate system (Xc,Yc,Zc), and consequently the orientation of this plane with respect to this coordinate system. This orientation gives the angle ΘClip1 directly. The measurement of the 3D coordinates of the markers of the clip 22 is conventionally done with iterative algorithms of the POSIT type described in the IEEE Transactions article on pattern analysis and machine intelligence—"Exact and Approximate Solutions of the Perspective-Three-Point Problem"—November 1992, vol. 14 No. 11, pp. 1100-1105 D. De Menthon and L. S. Davis.

The following angular relation is then obtained:

$$\Theta P1 = \Theta Clip1 - \Theta Cam1$$

Under the assumption that the method relied on the acquisition of a second image of the face of the individual looking at a target 8,18 placed in proximity to the video camera 7,17, said method would proceed as follows.

Figure 2:
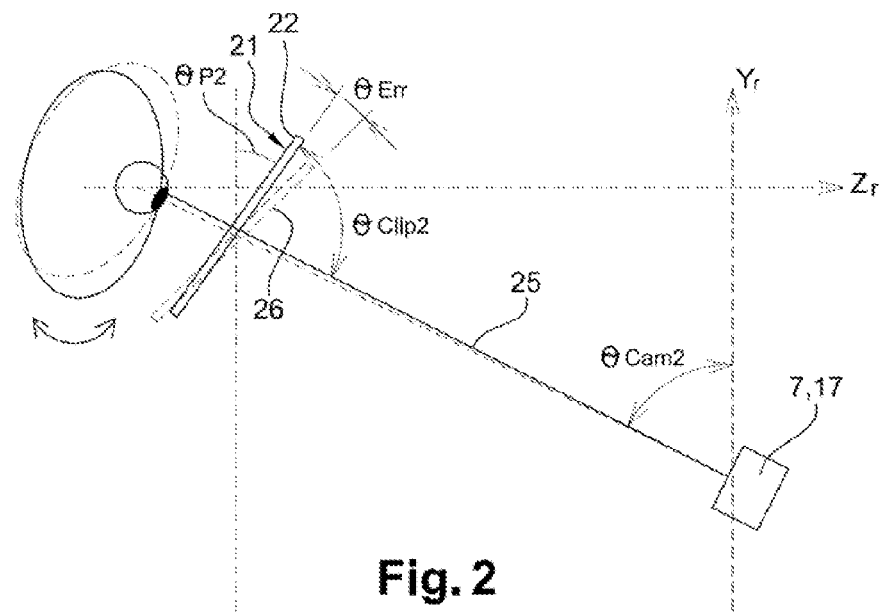
FIG. 2 is a schematic profile view of the head of an individual and of a video camera, the individual looking at a target on said video camera.
Figure 4:
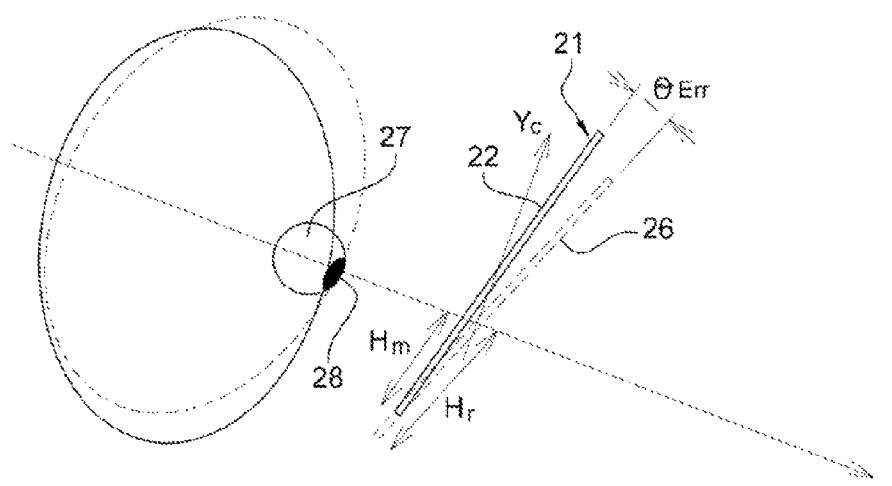
FIG. 4 is a schematic profile view of the head of an individual looking at a target on said video camera.

Referring to FIGS. 2 and 4, the optician asks the individual to adopt a second, comfortable and natural, posture consisting in looking at a target placed on the video camera 7,17. The optician acquires a second image. The pantoscopic angle ΘP2 is measured again. Ideally, the device does not shift between the two postures (ΘCam1=ΘCam2=ΘCam) since the field of the video camera is sufficiently large to cover the movement of the head between the 2 positions. A flash 9,19 is activated during this second image acquisition so as to obtain the corneal reflections. The corneal reflections are extracted from the image, as are the right-left lower edges and the right-left nasal side edges of the frame 21, so as to measure the heights (H) and the semi-pupillary distances (½PD). The clip 22 is also used to rescale the image and therefore to obtain correct values of H and PD. Referring to FIG. 4, here the measured height equals Hm and comprises an error, since the head carriage in the second posture is not the ideal head carriage delineated in FIGS. 2 and 4 by the dashed 26 clip 22, and for which the error is zero and which would correspond to a rotation of the head equal to an angle 90°−ΘCam, where ΘCam is the angle between the video camera 7,17 and the vertical. The real value of the height Hr differs from the measured height Hm by the relation Hr=Hm+ΔH. The angular error ΘErr has been represented by way of indication in FIG. 4 corresponding to the second posture, and dashed 26 the position of the head and of the clip 22 corresponding to a zero angular error ΘErr. This angular error originates from the fact that the angle of inclination between the plane of the individual's face and a horizontal direction, which said individual adopts during the first posture, is different from the angle of inclination between the plane of his face and the axis linking his eyes 27 to the target, and which he adopts during the second posture.

Figure 3:
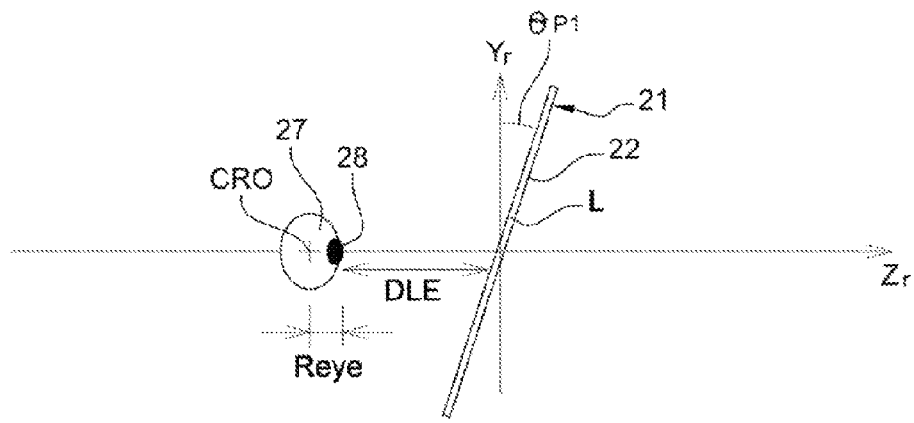
FIG. 3 is a schematic profile view of the head of an individual looking ahead at a point at infinity.

The errors in the heights H are corrected by taking into account the clip angulation error ΘErr in the second image and the lens-eye distance (DLE), which is delineated in FIG. 3. The angulation error is given by:

$$\Theta Err = \Theta P1 - \Theta P2 - (90° - \Theta Cam)$$

and the corrective on the height is given to a first approximation by:

$$\Delta H = (Reye + DLE) \times \tan(\Theta Err) = d(CRO, L) \times \tan(\Theta Err),$$

where Reye is the radius of the eye, being equal on average to 12 mm, and DLE is the lens-eye distance, being equal on average to 15 mm. The parameter d(CRO,L) represents the distance between the center of rotation CRO of the eye and the lens L. FIG. 3 makes it possible in particular to view the distances and the parameters represented by DLE, CRO, and Reye, by referring to the position of the lens L, that is to say to the position of the frame 21 or of the clip 22, as well as to the position of the eyes and of the pupil 28.

A method according to the invention is aimed at eliminating this angular correction step.

In this manner, a measurement method according to the invention and making it possible to determine morphogeometric parameters of an individual wearing spectacles by means of a measurement device according to the invention, comprises the following steps:

A step of acquiring an item of information relating to a first position of the frame 21 worn by an individual, when he is looking at a point situated in front of him at infinity, with a natural head carriage in a substantially horizontal direction 24.

According to a first preferred embodiment of a method according to the invention, a conventional mapping clip 22 furnished with markers is fixed on the frame 21, and a photo of the individual's face is taken with a high-definition video camera 7,17. The optician performs the usage adjustments of the image acquisition system 7,17, in regard to distance and inclination, to obtain an image centered on the screen of the face of the individual wearing the frame 21. By way of example, the image of the individual's face may be deemed satisfactory if it appears between two predefined coordinate systems of the screen that may be two parallel lines. Referring to FIG. 1, the computer then determines the precise three-dimensional orientation of the clip 22 of the frame 21, and deduces therefrom a pantoscopic angle ΘP1, which is determined as a function of the angle of the clip 22 ΘClip1 with respect to the sighting axis 25 of the video camera 7,17 and with respect to the angle of the video camera 7,17 with the vertical ΘCam1.

$$\Theta P1 = \Theta Clip1 - \Theta Cam1$$

According to a second preferred embodiment of a method according to the invention, an electronic mapping device in the form of a 3D sensor of accelerometer and/or inclinometer type is positioned or incorporated on the clip 22 which is fixed to the frame 21. In this case, the electronic mapping device is preferably positioned by the operator at a known location of the clip 22 so as to facilitate the calibration of the system. The system possesses per se, and in a known manner, an autonomous power supply system or one with a wired link to the electronic card 40, 50. The electronic mapping device can also be integrated directly into the clip 22. In this case, the clip possesses an integrated and autonomous power supply, and which is rechargeable in a wired manner or by way of a base provided for this purpose.

The electronic mapping device is linked, with a wired connection of USB type, or wireless connection of WIFI or Bluetooth mode type, to the electronic card (40, 50), which will directly process the signals received, so as to provide an item of information about the inclination of the frame.

The optician can then ask the wearer either to move around in a natural manner in the shop, for a few tens of seconds, or to remain seated and to adopt a natural head posture for a few seconds. The optician has the possibility either of intermittently triggering, via an input/remote control element, measurements of the inclination of the head carriage of the spectacle wearer, or of launching an automatic measurement of the inclination of the natural head carriage of the spectacles wearer. For this second option, measurements are performed regularly and, via statistical laws, the inclination of the face is then computed. The computer thereafter determines the precise 3D orientation of the clip of the frame 21, and deduces therefrom a pantoscopic angle ΘP1, which is determined as a function of the angle of the clip ΘClip1NaturalCarriage with respect to the vertical axis.

$$\Theta P1 = \Theta Clip1\text{NaturalCarriage}$$

Of a step of observation by the individual of the target 8,18 placed in a known position with respect to the high-definition video camera 7,17, while performing a movement of his head without taking his eyes off the target 8,18. Preferably this entails an upward pitching movement of his head. In the same manner as for the previous step, the optician performs the adjustments of the high-definition video camera 8,18 so as to obtain a utilizable image of the individual's face. The optician then asks the spectacle wearing individual to perform downward head nods, while fixing on the target 8,18. These head nods can be regarded as rotation movements of the head, around a horizontal axis parallel to an axis joining the individual's two shoulders, and performed in a vertical plane without lateral offset.

A step of acquiring several images of the individual's face during this head nod movement, each image corresponding to a particular degree of inclination of the head. Indeed, the optician triggers the high-definition video camera 7,17 to acquire a video of the individual's head nod movement. During this acquisition, the flash 9,19 has been triggered so as to obtain the corneal reflections. For each image extracted from the video, two parameters are measured:

A—The pantoscopic angle ΘP2=ΘClip2−ΘCam2 where ΘClip2 is the angle of the clip 22 with the axis 25 of the video camera and ΘCam2 is the angle between the axis 25 of the video camera and the vertical.

B—The clip angulation error ΘErr=ΘP1−ΘP2−(90°−ΘCam)

A step of selecting the image, for which the absolute value of the parameter ΘErr is less than a predetermined threshold value ε, and which is near zero. By way of example, this threshold value can be equal to 0.5°. The head nod movement must be sufficiently big as to include the "ideal" position of the face, for which the value of ΘErr is zero.

A step of processing by the computer of the selected image so as to determine the morpho-geometric parameters of the individual, on the basis of the position of the eyes 27, of the position of the frame 21 in the first posture, of the position of the frame 21 in the selected image, and of the degree of inclination of the high-definition video camera 7,17. This step therefore circumvents a sub-step of angular correction, performed by a specific algorithm, and therefore provides the desired morpho-geometric parameters directly.

A step of outputting the result of the measurements.

The value of the DLE can be measured by virtue of the images corresponding to the 2 postures. Accordingly, the 2 images are used, and the position, obtained with the markers 23, of the clip 22 is extracted, as is the position of the eyes 27 by way, for example, of the pupils 28, irises, corneal reflections or commissures.

These positions are determined by manual pointing at the image by the operator or by automatic detection by the computer on the 2 images. The iris, the corneal reflections and the pupils are elements which exhibit the advantage of being less masked by the frames, during a head nod by the individual, than the commissures. Moreover, manual pointing or automatic detection on the image of said elements will be done in a more precise manner, since they are more easily identifiable.

In contradistinction to the commissures, the eyes have a rotation movement and are mobile in the coordinate system of the clip 22. It is possible to compensate for the movement of the eye between the 2 images, so as to return to the case where the eyes would not have shifted with respect to the clip 22. Thus by compensating for the position of the eyes in the second image by a distance dP, we revert to the case where the object has not moved with respect to the clip 22. To a first approximation, dP is substantially equal to the value of translation of the pupil or of the iris or of the corneal reflection between the 2 images. A more precise geometric computation can be developed taking into account the radius of the eye, the angle between the video camera and the horizon, the variation of angle of the clip 22 between the 2 images and the variation of angle of the eye between the 2 images.

Furthermore, a geometric compensation related to the fact that the iris is not in the same plane as the vertex of the cornea is advantageously taken into account. In a preferential manner, a geometric compensation of the convergence defect related to the fact that the eyes 27 of the individual are not looking at the sensor of the acquisition system (7,17) but the vertex of the optical objective can also be integrated into the computations so as to decrease the potential sources of inaccuracy in the parameters determined with a method according to the invention.

The position Y1 and Y2 of the pupil 28 or of the iris or of the corneal reflections of the two eyes 27 in the plane of the clip 22 is determined for the 2 images by a projection of the pupil 28 or of the iris or of the corneal reflections of the two eyes 27 in the coordinate system of the clip 22, and the position of the CRO of the two eyes 27 in the coordinate system of the clip 22 is deduced therefrom by triangulation.

We have $d(CRO,L)=(Y1-Y2)/\tan(\Theta P1-\Theta P2)$

If the position of the commissures of the eyes 27 is used, we have:

$DLE=(Y1-Y2)/\tan(\Theta P1-\Theta P2)$ with Y1 and Y2 the coordinates of the commissures of the eyes.

In an arbitrary manner, it is possible to envisage taking an average value for the distance between the CRO and L, which could for example equal 27 mm. In a first alternative, the wearer can be asked, during the second image capture, to incline his head further, so as to have an angular discrepancy of at least 10°.

In a second alternative, the person can be asked to rotate their head without fixing on a target 8,18 or on a particular object and the DLE is measured by using the commissure of the eyes 27.

In the case where the spectacles 21 wearer does not incline his head between the two image captures, we have $\Theta P1=\Theta P2$.

The pupillary or semi-pupillary distance PD, the height H separating the pupil 28 of the eye 27 to the lower edge of the lens L or of the frame 21, the distance DLE between the eye 27 and the lens L, and the pantoscopic angle $\Theta P$, are the main morpho-geometric parameters which may be determined on the basis of a measurement method according to the invention.

The invention claimed is:

1. A method for measuring morpho-geometric parameters of an individual wearing spectacles, said method implementing an autonomous computerized device having a screen, a target, a compact image acquisition system furnished with a means for determining the inclination thereof, said system being linked to said screen, and a computer making it possible to control the image acquisition system and to process the images obtained, said method comprising the steps of:

acquisition of an item of information relating to a first position of the frame worn by an individual, when he is looking at a point situated in front of him at infinity, with a natural head carriage in a substantially horizontal direction, the pair of spectacles occupying a natural position on the individual's face, observation by the individual of the target placed in a known position with respect to the image acquisition system, while performing at least one upward pitching movement of his head without taking his eyes off the target, the pair of spectacles maintaining an unchanged position on the individual's face with respect to the first step, acquisition by means of the same image acquisition system as that used for the first posture, of several images of the individual's face during this rotation movement, each image corresponding to a particular degree of inclination of the head, selection of the image closest to the ideal image for which the inclination of the face with respect to an axis linking the eyes to the observed target is identical to the inclination of the face with respect to a horizontal direction adopted by the individual when he is looking at a point at infinity, Processing by the computer of the selected image so as to determine the morpho-geometric parameters of the individual, on the basis of the position of the eyes, of the position of the frame in the first posture, of the position of the frame on the selected image, and of the degree of inclination of the image acquisition system, outputting of the result of the measurements.

2. The measurement method as claimed in claim 1, wherein the image acquisition system is a high-resolution video camera.

3. The measurement method as claimed in claim 1, wherein the step of acquiring the item of information relating to the first position of the frame is carried out on the basis of an image of the individual's face, obtained with the image acquisition system.

4. The measurement method as claimed in claim 3, characterized in that the frame is equipped with a mapping element in the form of a clip furnished with markers and fixed on said frame, said markers being representative of the spatial orientation of the frame.

5. The measurement method as claimed in claim 1, wherein the step of acquiring the item of information relating to the first position of the frame is carried out by means of an electronic mapping device, said device being secured to the frame or on a clip fixed to said frame.

6. The measurement method as claimed in claim 5, wherein the clip is fitted with a wireless communication module making it possible to upload the measurements performed to a remotely situated rig.

7. The method as claimed in claim 1, the means for determining the inclination of the image acquisition system is an inclinometer.

8. The method as claimed in claim 1, wherein the morpho-geometric parameters measured by said method are the height between the pupil and the lower rim of the lens, and the pantoscopic angle.

9. The method as claimed in claim 1, wherein ban operator is placed in front of the spectacle wearing individual, said operator carrying out the adjustment of the image acquisition system and controlling the various steps of said method.

10. A measurement device for the implementation of a measurement method as claimed in claim 1, said device comprising a computer, at least one video camera equipped with an inclinometer and inclinable to fit within the size of an individual enabling said individual to adopt a natural posture, a display screen making it possible to view the pictures taken by said video camera as well as the result of the measurements, the position of the video camera and the position of the screen being able to be set independently of one another, characterized in that it comprises an element for mapping the frame in the form of a clip possessing markers.

11. The measurement device as claimed in claim 10, wherein said measurement device is a tablet grouping together the screen, a secondary video camera, the inclinometer and the computer, as well as said at least one video camera.

12. The measurement device as claimed in claim 11, wherein said measurement device comprises a support on which are fixed the tablet and the video camera.

13. The measurement device as claimed in claim 12, wherein the video camera and the tablet are situated on either side of a vertical plane and make between themselves an angle lying between 15 and 45°.

14. The measurement device as claimed in claim 10, wherein said measurement device comprises an electronic device for spatial mapping of the frame.

* * * * *

UNITED STATES PATENT AND TRADEMARK OFFICE
CERTIFICATE OF CORRECTION

PATENT NO. : 9,535,270 B2  
APPLICATION NO. : 14/414833  
DATED : January 3, 2017  
INVENTOR(S) : Divo et al.

Page 1 of 1

It is certified that error appears in the above-identified patent and that said Letters Patent is hereby corrected as shown below:

On the Title Page

At Item (71) Applicant: at Column 1, delete Lines 7-9, and insert:
--ESSILOR INTERNATIONAL (Compagnie Generale d'Optique)--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*